Figure 1:
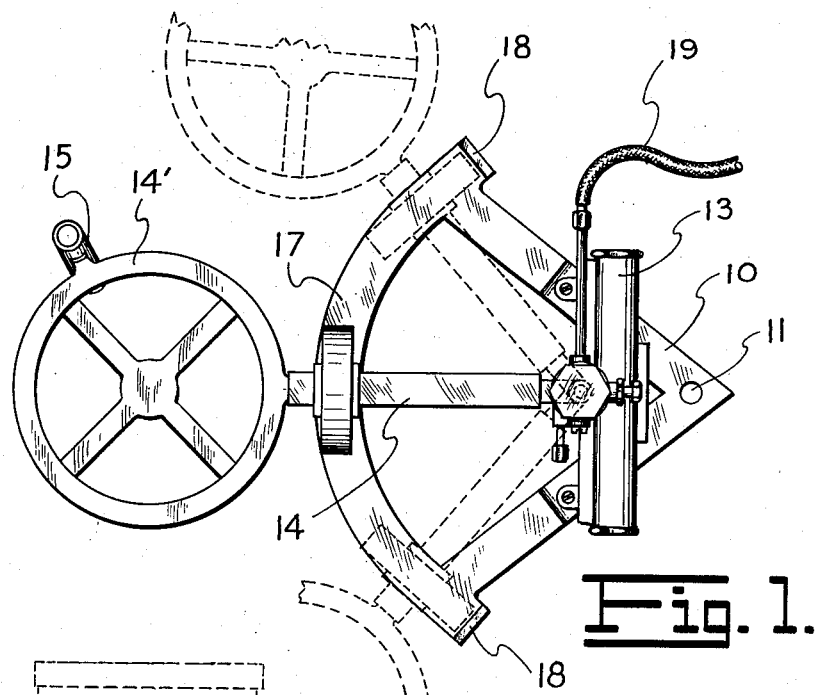

July 28, 1953  F. R. GARDUÑO  2,646,766

MOVING SIGNAL APPARATUS

Filed April 11, 1952

INVENTOR

FELIPE RUIZ GARDUÑO

BY

ATTY.

Patented July 28, 1953

2,646,766

UNITED STATES PATENT OFFICE 2,646,766

MOVING SIGNAL APPARATUS

Felipe Ruiz Garduño, Mexico City, Mexico

Application April 11, 1952, Serial No. 281,869
In Mexico June 21, 1951

2 Claims. (Cl. 116—58)

The present invention relates generally to a moving signal apparatus, capable of being used on railroad trains, freight trucks and any type of vehicle in general, and it relates more particularly to an apparatus by means of which a given signal, such as a red-light lantern, a flag, or a red light, is moved constantly and rhythmically along a predetermined path, for the purpose of making such signal far more visible and noticeable than any similar non-moving signal.

As is well known, both by way of precaution and in many instances because of obligations derived from legal provisions and regulations, railway convoys, freight trucks, and other vehicles are provided with signals, generally placed at the rear thereof, and consisting of a flag (often red) or a lantern (also generally red), or a red light, to announce their presence to other vehicles, especially when they are parked, in order thus to avoid collisions and other accidents. Such signals have heretofore been fixed, but it has always been thought that it would be far more convenient if such signals were moving, to make them more noticeable.

Bearing in mind this latter factor of convenience, the present invention provides an apparatus destined to carry a signal, for example, a lantern, flag, or red light, provided with axial or radial movement, using as the power source an air current furnished by the normal installation of the vehicle.

The present invention, together with its features, advantages, and unique aspects, will be made more clearly evident in the following description and in the drawings attached hereto to illustrate the same, like reference numbers being used in said drawings to indicate like parts in the two figures shown.

Figure 2:
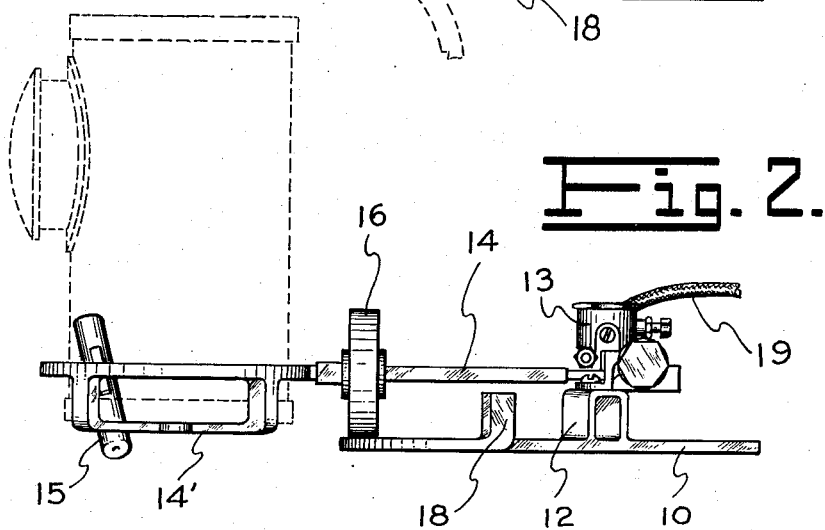

In said drawings:

Figure 1 is a plan view of a moving signal apparatus, constructed in accordance with the invention; and Figure 2 is a side elevation view of the apparatus illustrated in Figure 1, further showing in dotted lines the way in which a signal lantern is placed on said apparatus.

Before describing the invention in detail, I wish it to be clearly understood that said invention is not restricted to the details illustrated and described, and accordingly in practice such modifications and variations may be recurred to, as are considered or believed to be convenient or necessary, without any limitation other than the scope of the annexed claims.

Referring to the attached drawings, the apparatus of the invention is constituted by a supporting structure or base, formed by a V-shaped metal piece, 10, provided with a perforation 11, for attaching the same to a proper part of the vehicle, and with a hub or bearing part 12, for supporting or securing a reciprocating motor 13 including a reciprocal member, which imparts axial or radial movement to an arm 14, which ends in a lantern-bearing device 14'. The latter device in turn carries a device for carrying a flag or red light 15, and said moving arm 14 is provided with a wheel 16 (preferably having ball-bearings) and constitutes the shaft thereof. Wheel 16 facilitates the axial movement of arm 14, upon sliding along track or guide 17, secured to the support or base 10 and provided with stops 18 at its ends.

The driving apparatus for the axial movement of arm 14 is an apparatus of the type usually employed for such purpose, for example of the type used on automobiles for driving automatic windshield wipers in the rainy season, and operates either on the basis of expelled air or on the basis of air suction, as may be most convenient in accordance with the characteristics of the vehicle in which the unit is installed. The expelled air or the air suction are transmitted or conducted to the apparatus from the ordinary installation of the vehicle, by means of hose 19.

*Operation of apparatus.*—The receipt of the air current( supposing the apparatus to operate on the basis of pressure and not suction), through conduit or hose 19, in the driving apparatus for axial movement, mounted on hub 12 of base 10, will impart said axial movement to arm 14 of said apparatus, said movement being facilitated by the use of ball-bearing wheel 16, running along the track or guide up to its stops 18. As said arm 14 ends in a lantern-bearing device, provided in turn with a flag-holder or red-light holder 15, the corresponding signal placed in said device will obviously have the same axial movement as said arm 14, said movement being suspended only when the feeding of air to driving apparatus 13 is stopped.

Having thus described the invention, what I consider as new and desire to secure by Letters Patent is:

1. A signal comprising a frame including a horizontally disposed curved track, a vertically disposed bearing on the frame, a motor mounted on the vertical bearing including a reciprocal member, an arm secured to and extending outwardly from the reciprocal member, a visible signal on the free end of the arm, and a freely rotatable roller mounted on the arm and supported on the curved track, the roller travelling on the track when the arm is reciprocated.

2. A signal as defined in claim 1, free end of the arm has a depending frame to receive a visible signal, and a flag support mounted on the end of the arm and the depending frame.

FELIPE RUIZ GARDUÑO.

References Cited in the file of this patent

UNITED STATES PATENTS

| Number | Name | Date |
|---|---|---|
| 1,590,894 | Kellinger | June 29, 1926 |
| 1,763,821 | Roesen | June 17, 1930 |
| 2,236,879 | Morris | Apr. 1, 1941 |
| 2,387,953 | Terry | Oct. 30, 1945 |